(12) United States Patent
Kikuchi

(10) Patent No.: US 12,477,157 B2
(45) Date of Patent: Nov. 18, 2025

(54) STREAMER TERMINAL, DISPLAY METHOD, AND NON-TRANSITORY COMPUTER READABLE MEDIUM FOR DISPLAYING VIDEO DURING LIVE STREAMING

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/783,933

(22) PCT Filed: Feb. 16, 2022

(86) PCT No.: PCT/JP2022/006174
§ 371 (c)(1),
(2) Date: Aug. 24, 2023

(87) PCT Pub. No.: WO2023/157124
PCT Pub. Date: Aug. 24, 2023

(65) Prior Publication Data
US 2024/0187655 A1 Jun. 6, 2024

(51) Int. Cl.
*H04N 21/2187* (2011.01)
*G06V 10/56* (2022.01)
*G06V 10/60* (2022.01)
*H04N 21/431* (2011.01)

(52) U.S. Cl.
CPC ......... *H04N 21/2187* (2013.01); *G06V 10/56* (2022.01); *G06V 10/60* (2022.01); *H04N 21/4318* (2013.01)

(58) Field of Classification Search
None
See application file for complete search history.

(56) References Cited

U.S. PATENT DOCUMENTS

2013/0229482 A1 9/2013 Vilcovsky et al.
2019/0272675 A1* 9/2019 Wagner .................. H04N 23/57

FOREIGN PATENT DOCUMENTS

| JP | 2008-054331 A | 3/2008 |
| JP | 2016-509683 A | 3/2016 |
| JP | 2019-47366 A  | 3/2019 |
| JP | 2020-042551 A | 3/2020 |

OTHER PUBLICATIONS

International Search Report of PCT/JP2022/006174 dated Apr. 26, 2022 [PCT/ISA/210].
An English translation of communication issued Dec. 17, 2024 in Japanese Application No. 2024-192789.

* cited by examiner

*Primary Examiner* — James R Marandi
(74) *Attorney, Agent, or Firm* — Sughrue Mion, PLLC

(57) ABSTRACT

A generator (251) generates a viewer video in which an object is synthesized at a predetermined synthesis position in a live video captured by an imager (210). Additionally, the generator (251) generates a streamer video that is a video obtained by synthesizing the object in a mirror image video in which the live video is inverted, and in which the object is synthesized at a mirror image position relative to the synthesis position. A streaming unit (252) sends the viewer video generated by the generator (251) to a streaming server for streaming to the viewer terminal. A display 260) displays the streamer video generated by the generator (251).

7 Claims, 21 Drawing Sheets

STREAMER TERMINAL, DISPLAY METHOD, AND NON-TRANSITORY COMPUTER READABLE MEDIUM FOR DISPLAYING VIDEO DURING LIVE STREAMING

TECHNICAL FIELD

The present disclosure relates to a streamer terminal, a display method, and a non-transitory computer readable medium for displaying video during live streaming.

BACKGROUND ART

In recent years, the type of electronic commerce known as "live streaming commerce" has gathered attention. Live streaming commerce is a type of electronic commerce in which a streamer streams live video introducing a product, and viewers that are viewing the live video can purchase the product.

For example, Patent Literature 1 describes an online commerce support system in which a seller (streamer) streams a live movie (live video) via a terminal of the seller (streamer terminal), and a viewer that is viewing the live video can purchase a product while asking questions to the seller.

CITATION LIST

Patent Literature

Patent Literature 1: Unexamined Japanese Patent Application Publication No. 2020-42551

SUMMARY OF INVENTION

Technical Problem

While not limited to the live streaming commerce described above, in a case in which a streamer streams a live video of the streamer, generally, a mirror image video in which the live video is inverted (mirror-inverted) and displayed instead of the live video being displayed as captured by the camera (imager). That is, the streamer carries out the streaming while checking the mirror image video displayed on the display of the streamer terminal, in the same manner as when checking their appearance in front of a mirror.

In such a live video, objects that include character information to be notified to a viewer (in the case of live streaming commerce, purchase buttons for the product, subtitles detailing the features of the product, and the like) are sometimes synthesized. In such a case, since such objects are also displayed on the display of the streamer terminal in an inverted manner, there is a problem in that the readability of the character information included in the object significantly decreases. Note that, although the objects may be synthesized on the mirror image video after the live video is inverted, simply synthesizing the objects at the same positions as in the live video could result in the streamer pointing to a position different than the object in the live image being viewed by the viewer, when the streamer performs an action such as pointing at an object.

The present disclosure is made with the view of the above situation, and an objective of the present disclosure is to provide a streamer terminal, a display method, and a non-transitory computer readable medium capable of appropriately supporting the streamer.

Solution to Problem

A streamer terminal according to a first aspect of the present disclosure includes:
 a processor configured to execute
  sending of a viewer video that is a video in which an object is synthesized at a predetermined synthesis position in a live video captured by an imager, and that is for streaming to a viewer terminal, and
  displaying of a streamer video that is a video obtained by synthesizing the object in a mirror image video in which the live video is inverted, and in which the object is synthesized at a mirror image position relative to the synthesis position.

In the streamer terminal according to the aspect described above, a configuration is possible in which
 the processor is further configured to execute
  changing, in accordance with an operation from a streamer with respect to the object in the streamer video, a display mode for the object synthesized in the live video and the mirror image video.

In the streamer terminal according to the aspect described above, a configuration is possible in which the changing of the display mode includes at least one of a change of a size, a shape, a color, a pattern, a brightness, and a luminance of the object.

In the streamer terminal according to the aspect described above, a configuration is possible in which
 the processor is further configured to
  when the object in the streamer video is moved to a new position due to an operation by the streamer, execute changing of a position of a normal image relative to the new position for the object synthesized in the live video.

In the streamer terminal according to the aspect described above, a configuration is possible in which transition information for transitioning to a sales server for selling a product is appended to the object.

In the streamer terminal according to the aspect described above, a configuration is possible in which the object includes character information.

A display method according to a second aspect of the present disclosure includes:
 executing, by a computer,
 a processor configured to execute
  sending of a viewer video that is a video in which an object is synthesized at a predetermined synthesis position in a live video captured by an imager, and that is for streaming to a viewer terminal, and
  displaying of a streamer video that is a video obtained by synthesizing the object in a mirror image video in which the live video is inverted, and in which the object is synthesized at a mirror image position relative to the synthesis position.

A non-transitory computer readable medium according to a third aspect of the present disclosure stores a program for causing a computer to execute:
 sending of a viewer video that is a video in which an object is synthesized at a predetermined synthesis position in a live video captured by an imager, and that is for streaming to a viewer terminal, and
 displaying of a streamer video that is a video obtained by synthesizing the object in a mirror image video in which the live video is inverted, and in which the object is synthesized at a mirror image position relative to the synthesis position.

Advantageous Effects of Invention

According to the present disclosure, the streamer can be appropriately supported.

DESCRIPTION OF EMBODIMENTS

Figure 1:
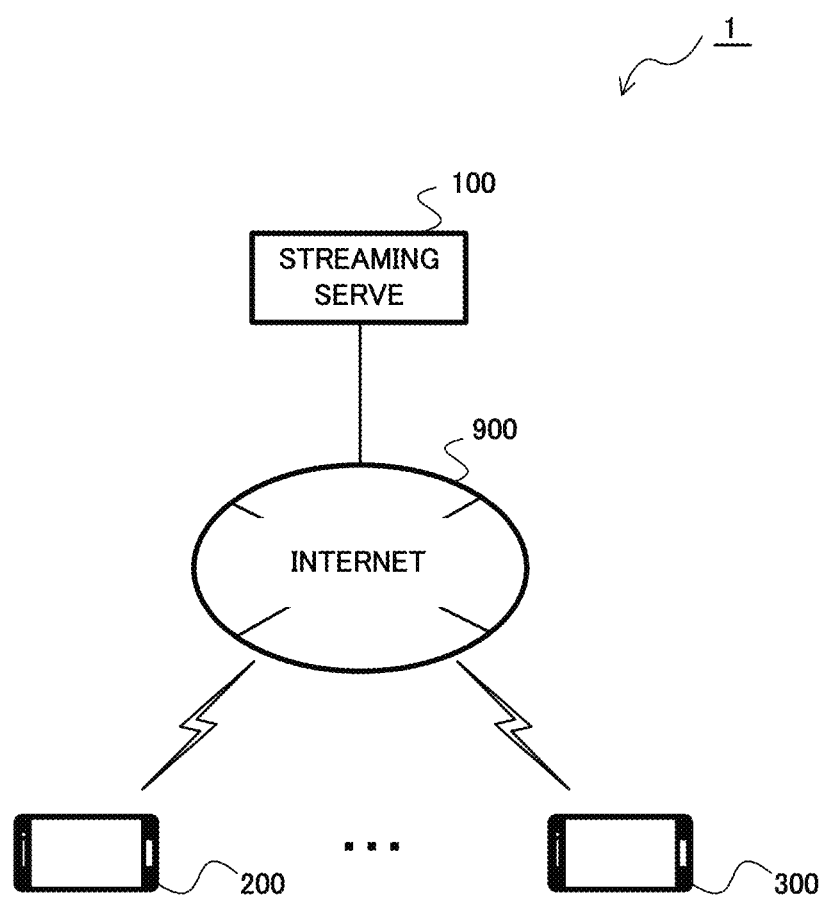
FIG. 1 is a schematic view illustrating an example of the entire configuration of a live streaming system according to Embodiment 1 of the present disclosure.

Hereinafter, embodiments of the present disclosure are described in detail while referencing drawings. Note that, in the drawings, identical or corresponding components are denoted with the same reference numerals. Additionally, in the following, a case is described in which a streamer terminal synthesizes an object in a video but, as described later, the present disclosure can be likewise applied to a case in which an object is synthesized in a video in a streaming server. That is, the following embodiments are presented for the purpose of explanation and should not be construed as limiting the scope of the present disclosure. Therefore, embodiments in which some elements or all elements of these embodiments are replaced with equivalent elements by one skilled in the art can also be employed, and such embodiments are also included within the scope of the present disclosure.

Embodiment 1

FIG. 1 is a schematic view illustrating an example of the entire configuration of a live streaming system 1 according to Embodiment 1 of the present disclosure. In one example, the live streaming system 1 is communicably connected, via an internet 900, to a streaming server 100 for managing streaming, a streamer terminal 200 used by a streamer, and a viewer terminal 300 used by a viewer. Note that, it is assumed that multiple viewer terminals 300 exist, the number thereof corresponding to the number of viewers using the system.

In one example, the streaming server 100 is a server computer or the like, and manages the entire live streaming system 1. The streaming server 100 receives a video (viewer video described later) sent from the streamer terminal 200, and streams the received video to the viewer terminal 300. Note that, in the present disclosure, a case is described in which the video includes not only video data, but also audio data.

In one example, the streamer terminal 200 is a terminal such as a smartphone, a tablet, a personal computer (PC) or the like, and is used by a streamer that streams live video. As described later, the streamer performs live streaming by imaging the streamer using an imager (imager 210 described later) of the streamer terminal 200. Here, a mirror image video in which the captured live video is inverted is displayed on a display (display 260 described later) and, as such, the streamer confirms the motions and the like of the streamer while viewing the mirror image video.

In one example, the viewer terminal 300 is a terminal such as a smartphone, a tablet, a personal computer (PC) or the like, and is used by a viewer that views the live streaming. The viewer operates the viewer terminal 300 to login to the streaming server 100 or the like and, then, views the live video streamed from the streamer terminal 200 via the streaming server 100.

Overview of configuration of information processing device 400 Next, the streaming server 100, and a typical information processing device 400 in which the streamer terminal 200 and the like are realized, according to Embodiment 1, are described.

Figure 2:
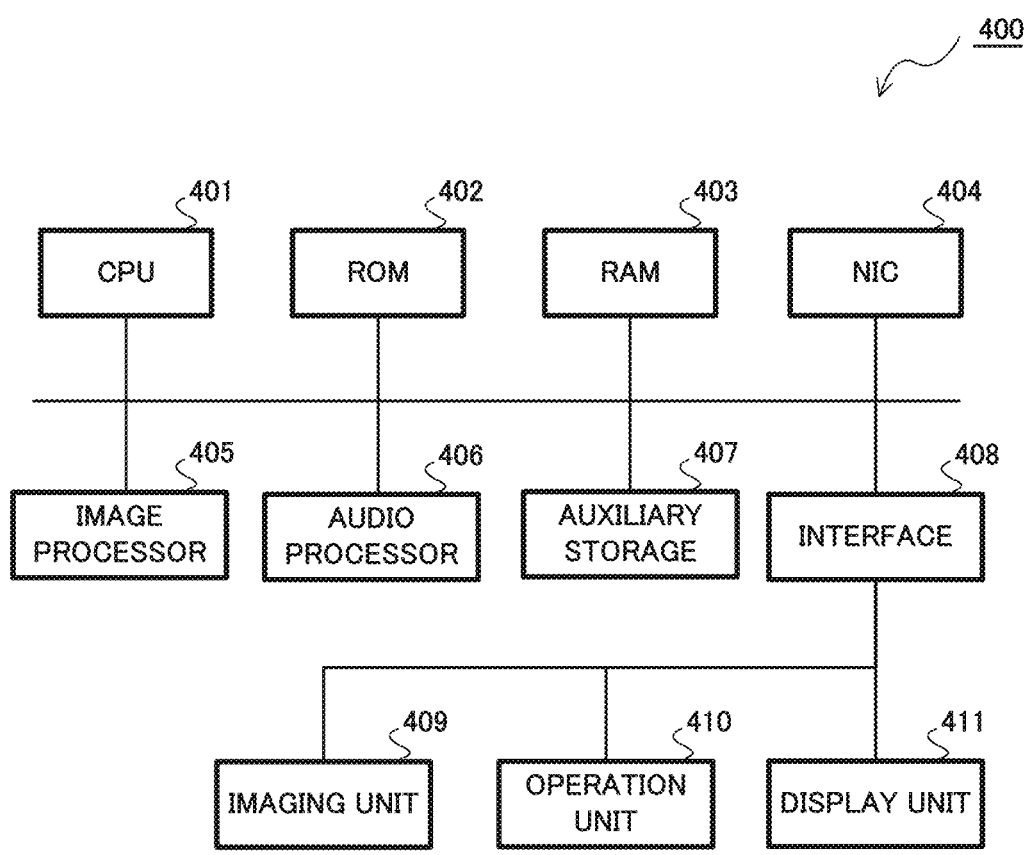
FIG. 2 is a block diagram illustrating an example of an overview of the configuration of a typical information processing device in which a streamer terminal and the like is realized.

As illustrated in FIG. 2, the information processing device 400 includes a central processing unit (CPU) 401, a read-only memory (ROM) 402, a random access memory (RAM) 403, a network interface card (NIC) 404, an image processor 405, an audio processor 406, an auxiliary storage 407, an interface 408, an imaging unit 409, an operation unit 410, and a display unit 411.

The CPU 401 controls the operations of the entire information processing device 400, and is connected to and exchanges control signals and data with the various components.

An initial program loader (IPL) that is executed immediately after the power is tuned ON is stored in the ROM 402 and, by executing this IPL, a program stored in the auxiliary storage 407 is read out to the RAM 403 and execution of the program by the CPU 401 is started.

The RAM 403 is for temporarily storing data and programs. The RAM 403 holds the program and data read out from the auxiliary storage 407, data required for communicating, and the like.

The NIC 404 is for connecting the information processing device 400 to a computer communication network such as the internet, and includes a component that is compliant with a 10BASE-T/100BASE-T standard used when constructing a local area network (LAN), an analog modem for connecting to the internet unit using a telephone line, an integrated services digital network (ISDN) modem, an asymmetric digital subscriber line (ADSL) modem, a cable modem for connecting to the internet using a cable television line, and the like.

The image data read out from the auxiliary storage 407 or the like is processed by the CPU 401 and an image computation processor (not illustrated in the drawings) of the image processor 405 and, then, the image processor 405 stores the processed image data in a frame memory (not illustrated in the drawings) of the image processor 405. The image information stored in the frame memory is converted to a video signal at a predetermined periodic timing, and output to the display unit 411 via the interface 408 or the like. That is, under the control of the CPU 401, the image processor 405 generates an image needed during the progression of the processing performed by the information processing device 400, and displays that image on the display unit 411.

The audio processor 406 converts music data and audio data read out from the auxiliary storage 407 or the like to audio signals, and outputs the audio signals out via the interface 408 or the like. Note that, when a speaker is provided inside the information processing device 400, the audio processor 406 outputs the converted audio signals to that speaker. That is, under the control of the CPU 401, the audio processor 406 generates a music sound and audio to be used during the progression of the processing performed by the information processing device 400, and outputs that music sound and the like from an internal or external speaker.

The auxiliary storage 407 is a hard disk, a solid state drive (SSD), or the like, and stores various types of programs and various types of data needed to carry out operations/control of the entire information processing device 400. For example, the auxiliary storage 407 stores a program for realizing the streamer terminal 200 and the like according to some embodiments. Due to the control by the CPU 401, the auxiliary storage 407 appropriately reads out the stored programs and data and temporarily stores the read out programs and data in the RAM 403 or the like.

In one example, the interface 408 is compliant with a standard such as HDMI (registered trademark), universal serial bus (USB), inter-integrated circuit (I2C), or the like, and the imaging unit 409, the operation unit 410, and the display unit 411 are connected to the interface 408. Note that the interface 408 may exchange necessary information with other connected external devices.

In one example, the imaging unit 409 is an imaging device having a single focus lens and a predetermined number of pixels (complementary metal oxide semiconductor (CMOS), charge coupled device (CCD), or the like), and captures still images or videos.

The operation unit 410 receives operations/inputs of a worker using the information processing device 400, or the like.

The display unit 411 draws an image corresponding to the image data output from the image processor 405, and presents the drawn image to the worker using the information processing device 400, or the like.

Alternatively, a configuration is possible in which the information processing device 400 includes a drive unit such as a digital versatile disc (DVD) ROM or the like instead of the auxiliary storage 407. In such a case, the information processing device 400 reads out the programs and data from the DVD-ROM or the like mounted in the drive unit, and operates in the manner described above.

Next, functions and the like of the streaming server 100 and the streamer terminal 200 realized in the information processing device 400 are described while referencing FIGS. 3 to 12. When the power of the information processing device 400 is turned ON, a program causing the information processing device 400 to function as the streaming server 100 and the streamer terminal 200 according to Embodiment 1 is executed, and the streaming server 100 and the streamer terminal 200 according to Embodiment 1 are realized. Note that, although the viewer terminal 300 is likewise realized by the information processing device 400, the configuration is mostly the same as the streamer terminal 200 and, as such, description thereof is forgone.

Functional Configuration of Streaming Server 100

Figure 3:
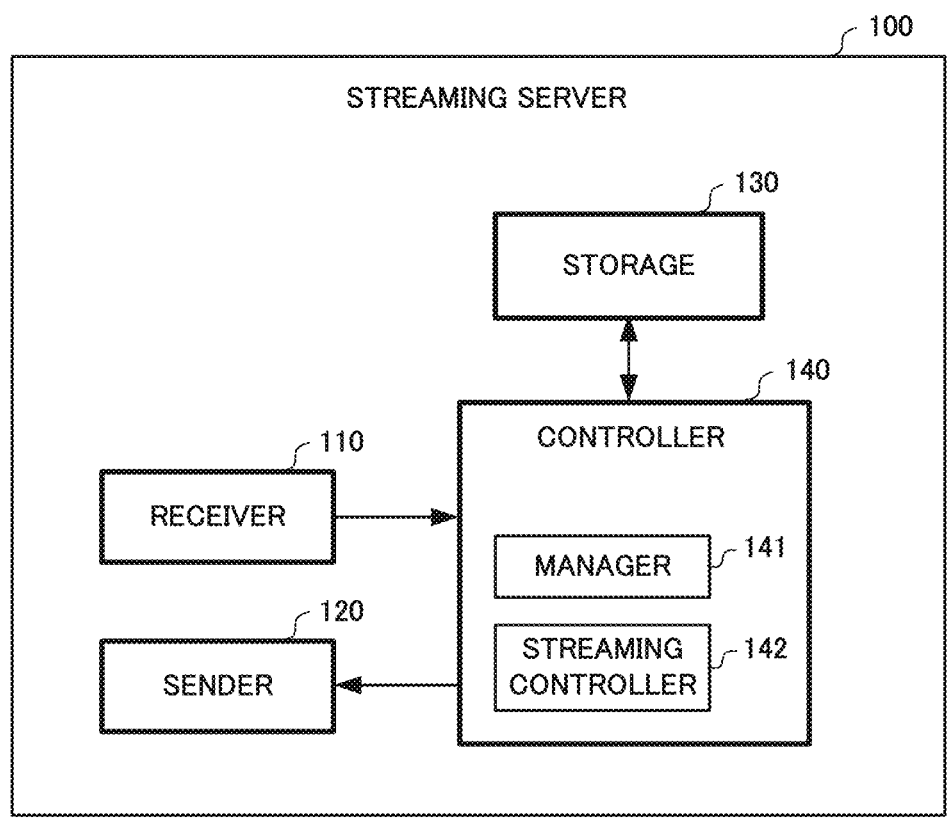
FIG. 3 is a block diagram illustrating an example of the functional configuration of a streaming server.

FIG. 3 is a block diagram illustrating an example of the functional configuration of the streaming server 100. As illustrated in FIG. 3, the streaming server 100 includes a receiver 110, a sender 120, a storage 130, and a controller 140.

The receiver 110 receives a variety of information sent, via the internet 900, from the streamer terminal 200 and the viewer terminal 300. For example, the receiver 110 receives a video (viewer video described later) sent from the streamer terminal 200. Additionally, the receiver 110 receives a login request and the like from the viewer terminal 300. Note that the NIC 404 described above can function as this receiver 110.

The sender 120 sends, via the internet 900, a variety of information to the viewer terminal 300 and the like. For example, the sender 120 is controlled by the controller 140 (streaming controller 142 described later), and streams the video received from the streamer terminal 200 to the viewer terminal 300. Note that the NIC 404 described above can function as this sender 120.

The storage 130 stores a variety of information needed for the processing in the streaming server 100. For example, the storage 130 stores an ID, a password, and the like of the viewer using the viewer terminal 300. Note that the auxiliary storage 407 described above or the like can function as this storage 130.

The controller 140 controls the entire streaming server 100. In one example, the controller 140 includes a manager 141 and a streaming controller 142.

In one example, the manager 141 authenticates the viewer by comparing the ID, the password, and the like sent from the viewer terminal 300 requesting the login with the ID, the password, and the like stored in the storage 130.

The streaming controller 142 controls the receiver 110 and the sender 120 and streams the video received from the streamer terminal 200 to the viewer terminal 300.

The CPU 401 described above or the like can function as the controller 140 having such a configuration.

Functional Configuration of Streamer Terminal 200

Figure 4:
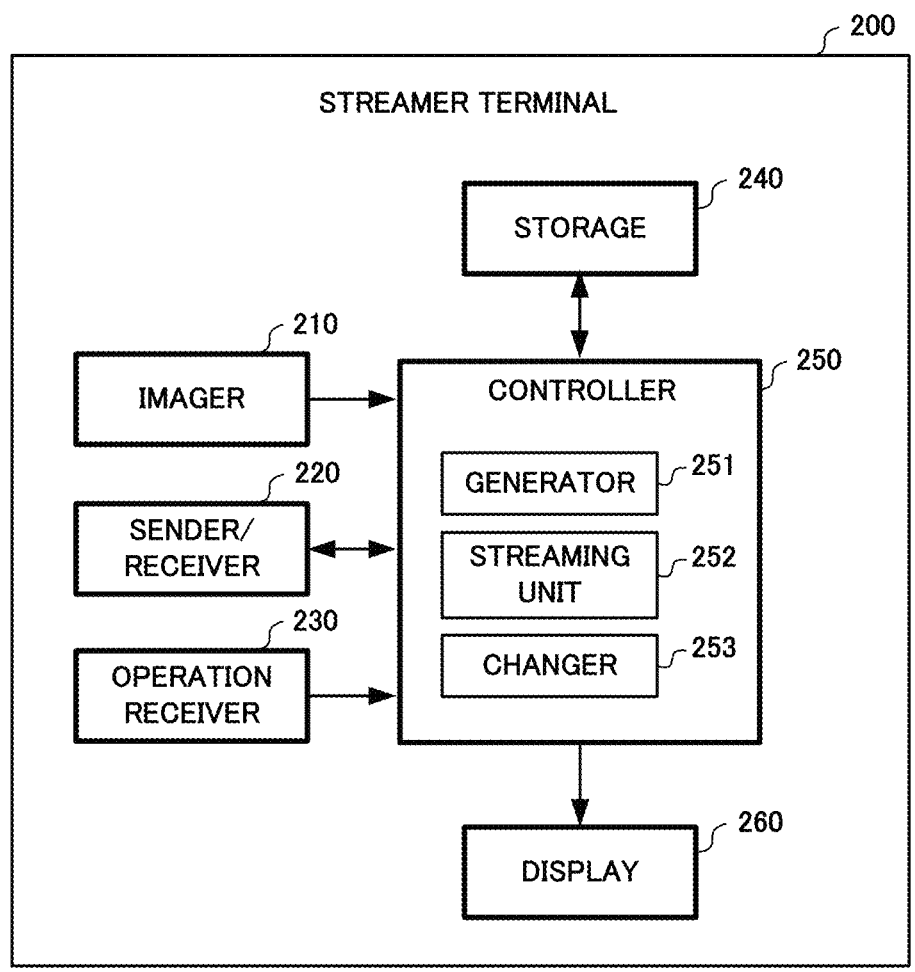
FIG. 4 is a block diagram illustrating an example of the functional configuration of the streamer terminal according to Embodiment 1.

FIG. 4 is a block diagram illustrating an example of the functional configuration of the streamer terminal 200 according to Embodiment 1. As illustrated in FIG. 4, the streamer terminal 200 includes an imager 210, a sender/receiver 220, an operation receiver 230, a storage 240, a controller 250, and a display 260.

Figure 5:
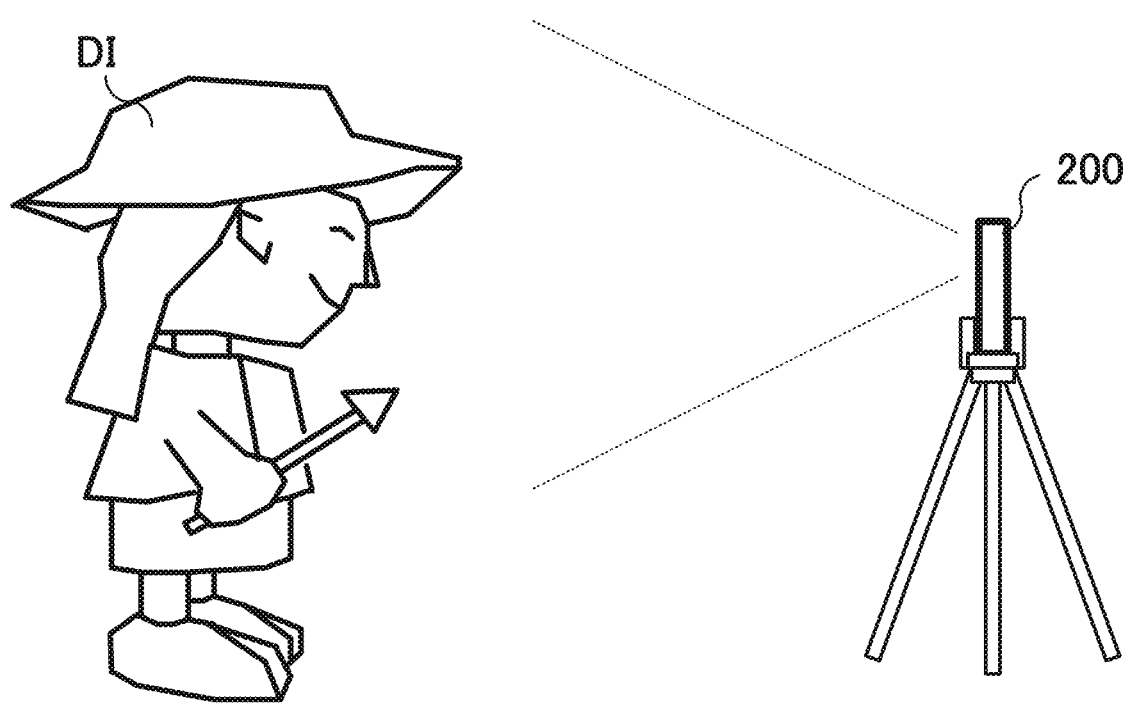
FIG. 5 is a schematic drawing illustrating an example of imaging of a streamer.
Figure 6:
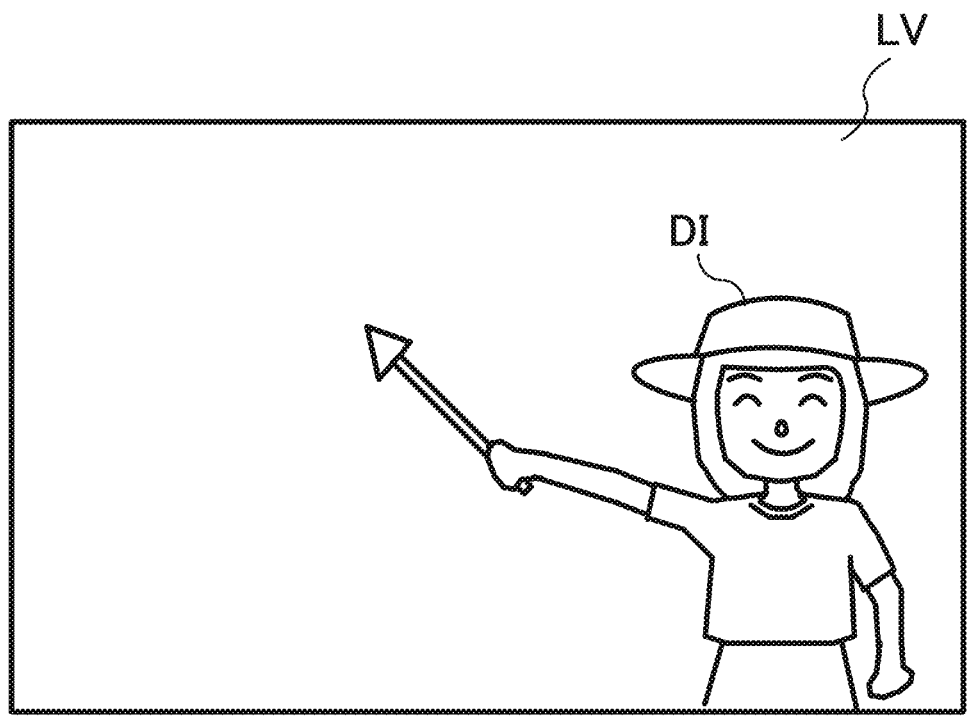
FIG. 6 is a schematic drawing illustrating an example of a live video being captured.

In one example, the imager 210 is a camera disposed on an inner side (the display 260 side) of the streamer terminal 200, and images the streamer. In one example, as illustrated in FIG. 5, the streamer terminal 200 is supported by a tripod or the like and is arranged in front of a streamer DI, and images the streamer DI. The imager 210 outputs a live video LV including the streamer DI, such as illustrated in FIG. 6. Note that the imaging unit 409 described above can function as this imager 210.

Returning to FIG. 4, the sender/receiver 220 exchanges a variety of information with the streaming server 100 via the internet 900. For example, the sender/receiver 220 is controlled by the controller 250 (streaming unit 252 described later) and sends a viewer video described later to the streaming server 100 (streams to the viewer terminal 300 via the streaming server 100). Note that the NIC 404 described above can function as this sender/receiver 220.

The operation receiver 230 is a touch panel or a pointing device (mouse or the like), and receives various types of operations from the streamer. For example, the operation receiver 230 receives an operation directed at the streamer video (more specifically, an object described later) displayed on the display 260. Note that the operation unit 410 described above can function as this operation receiver 230.

The storage 240 stores a variety of information needed for the processing in the streamer terminal 200. For example, the storage 240 stores information about an object to be synthesized in the live video or the like, a synthesis position of the object, and the like. In one example, the object is a subtitle (banner) including character information to be notified to the viewer in the live streaming. The synthesis position is a position in the live video at which the object is to be synthesized. That is, the synthesis position is defined on the basis of the live video. Note that the auxiliary storage 407 described above or the like can function as this storage 240.

The controller 250 controls the entire streamer terminal 200. In one example, the controller 250 includes a generator 251, a streaming unit 252, and a changer 253.

Figure 7:
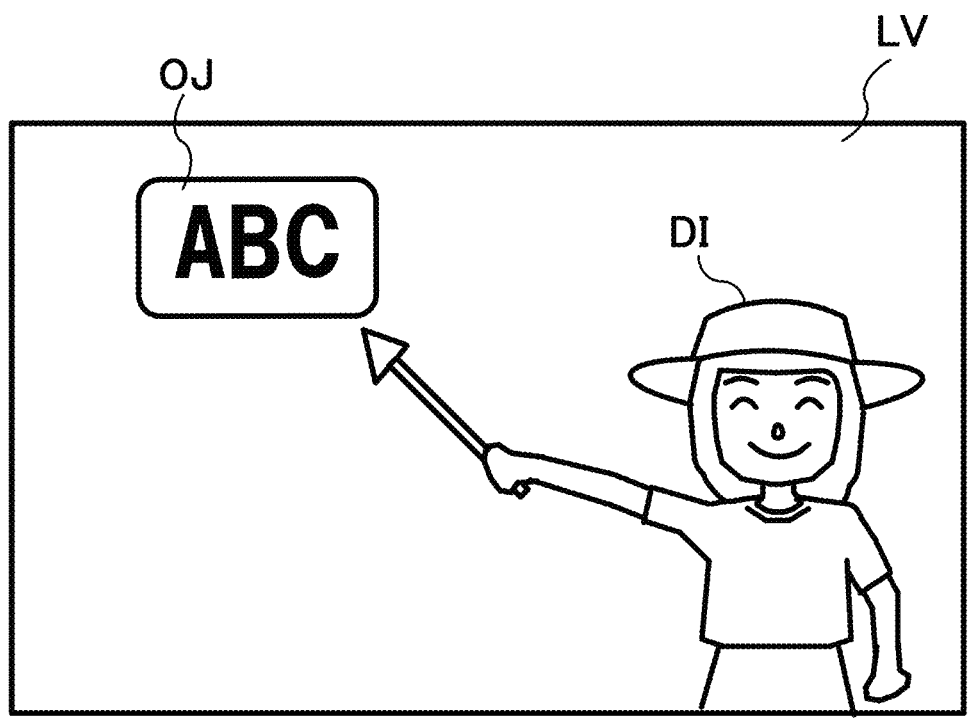
FIG. 7 is a schematic view illustrating an example of a viewer video in which an object is synthesized in the live video.

The generator 251 generates a viewer video in which an object is synthesized at a predetermined synthesis position in the live video captured by the imager 210. For example, in accordance with the information and the synthesis position of the object stored in the storage 240, the generator 251 generates a viewer video in which an object OJ is synthesized in the live video LV, as illustrated in FIG. 7. Note that, in FIG. 7, an example of a case is illustrated in which the object OJ that includes the simple character information of "ABC" is synthesized, but this example is given to facilitate ease of description and, in actuality, the object OJ that includes character information needed for notifying to the viewer is synthesized.

Figure 8:
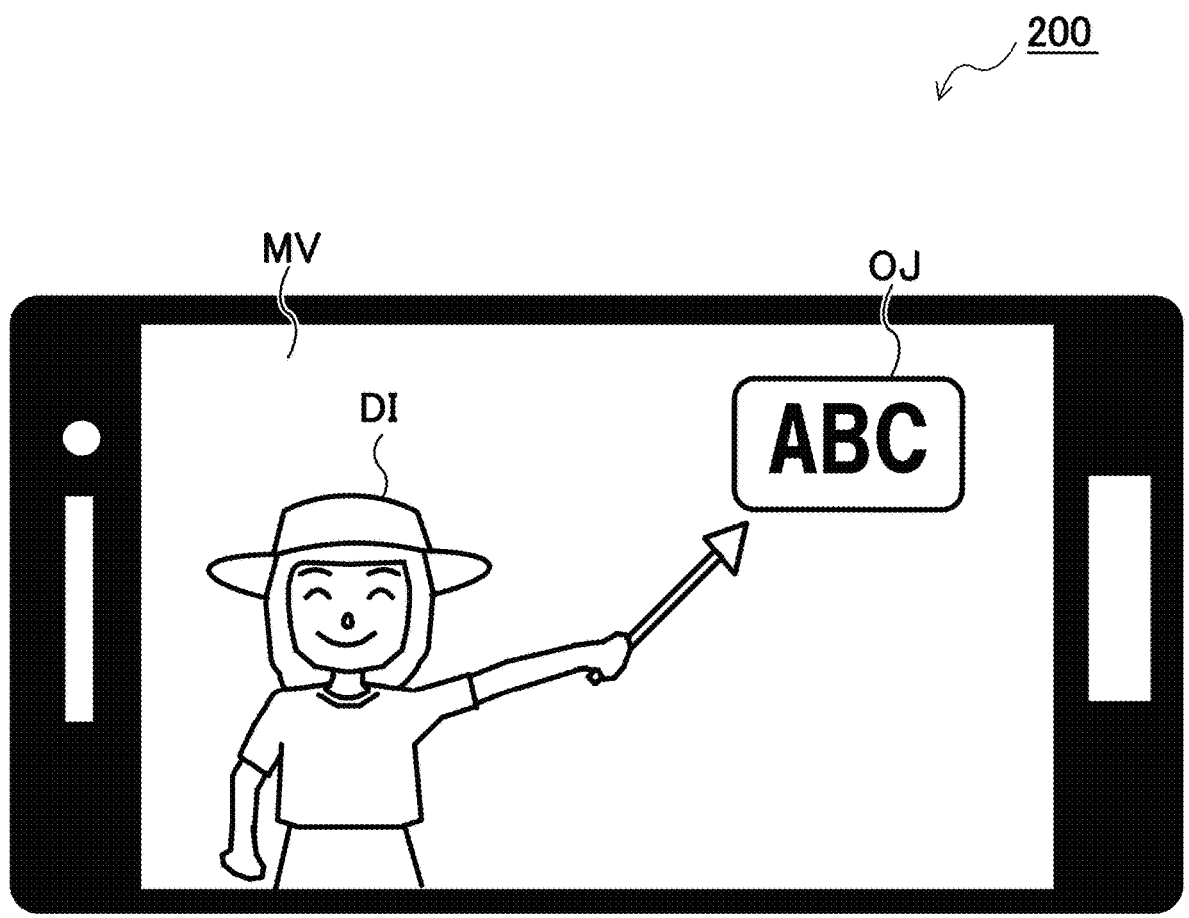
FIG. 8 is a schematic view illustrating an example of a case in which a streamer video, obtained by synthesizing the object in a mirror image video, is displayed on the streamer terminal.

At the same time, the generator 251 generates a streamer video obtained by synthesizing the object in a mirror image video in which the live video is inverted. Note that the position at which the object is synthesized in the mirror image video differs from the synthesis position described above. Specifically, the generator 251 synthesizes the object in the mirror image video at a mirror image position relative to the synthesis position. For example, in accordance with the mirror image position relative to the synthesis position and the information of the object stored in the storage 240, the generator 251 generates a streamer video in which the object OJ is synthesized in the mirror image video MV, as illustrated in FIG. 8. Note that FIG. 8 illustrates the streamer video being displayed on the display 260. As a result, the streamer DI can normally read the character information of the object OJ synthesized in the mirror image video MV displayed on the display 260, and can normally point to the object OJ. Therefore, the object OJ is correctly pointed to, even in the viewer video of FIG. 7. As a result, the streamer that is performing the live streaming can be appropriately supported.

Returning to FIG. 4, the streaming unit 252 sends the viewer video generated by the generator 251 to the streaming server 100 for streaming to the viewer terminal 300. That is, the streaming unit 252 controls the sender/receiver 220 to send the viewer video such as illustrated in FIG. 7 to the streaming server 100, and stream the viewer video to the viewer terminal 300 via the streaming server 100.

Figure 9:
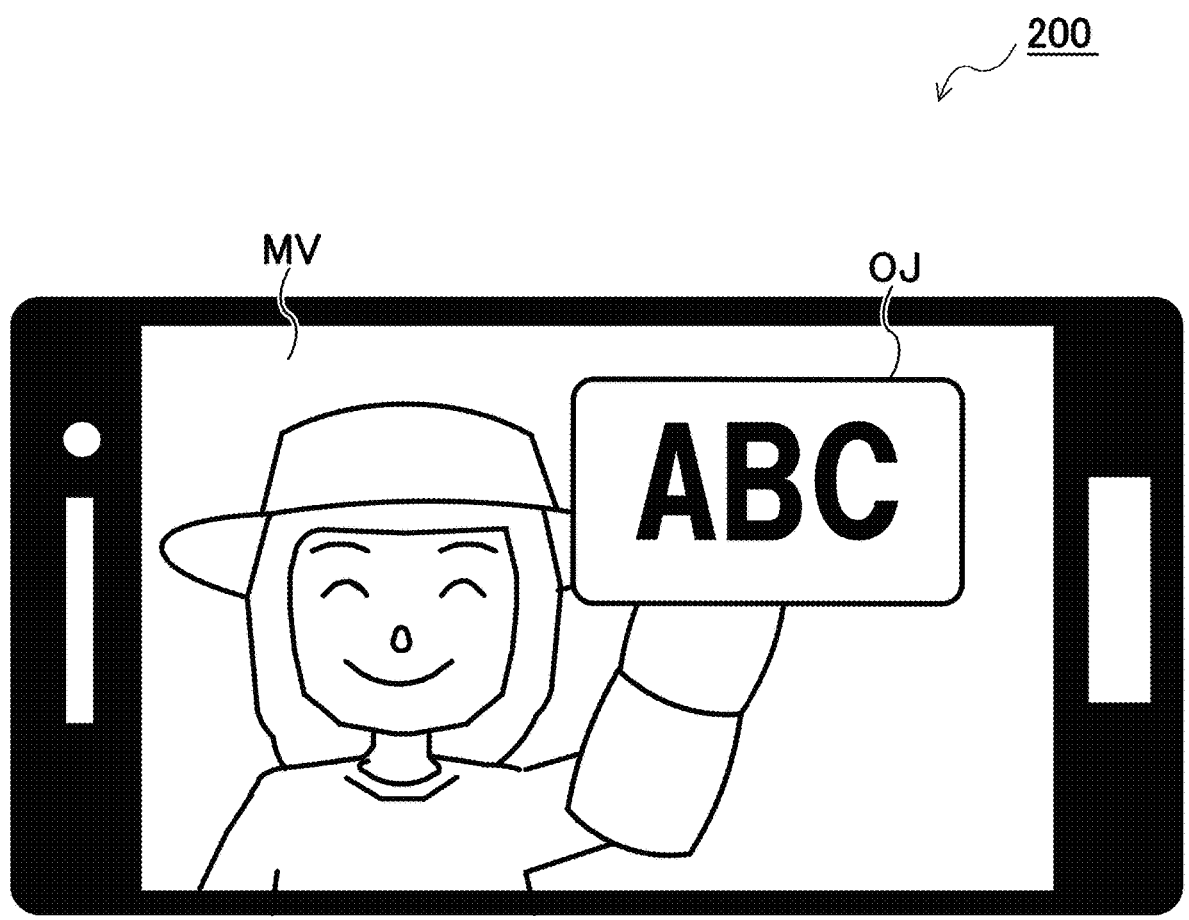
FIG. 9 is a streamer video illustrating a case in which the object in the streamer video is pinch-operated (pinched-out) by the streamer.
Figure 10:
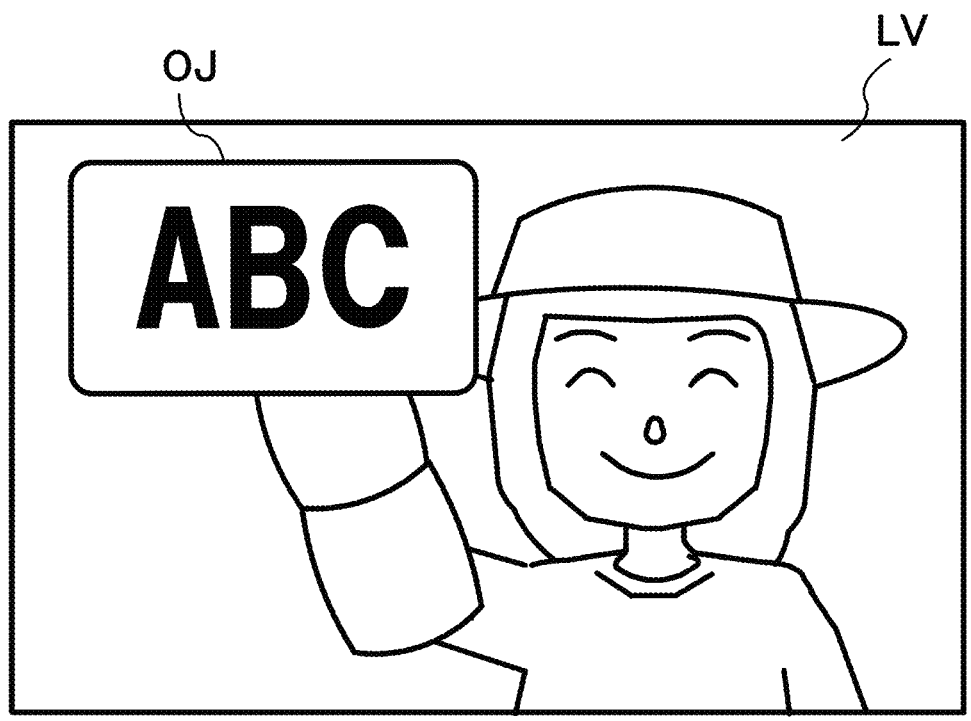
FIG. 10 is a schematic view illustrating a situation in which a size of the object synthesized in the viewer video is changed in accordance with the pinch-operation of the streamer.

The changer 253 changes, in accordance with an operation from the streamer with respect to the object in the streamer video, a display mode of the object synthesized in the live video and the mirror image video. For example, the changer 253 changes the size of the object OJ in accordance with a pinch-operation performed on the object OJ in the streamer video such as illustrated in FIG. 8 that is displayed on the display 260. Specifically, the changer 253 enlarges the size of the object OJ as illustrated in FIG. 9 when the operation receiver 230 receives a pinch-out (an operation of pressing the object OJ with two fingers and, then, while pressing, spreading those fingers) performed on the object OJ by the streamer. Conversely, the changer 253 reduces the size of the object OJ when the operation receiver 230 receives a pinch-in (an operation of pressing the object OJ with two fingers and, then, while pressing, closing those fingers) performed on the object OJ by the streamer. Note that, when the changer 253 changes the size of the object OJ in the streamer video, the changer 253 also updates the information about the object stored in the storage 240. For example, when, as in FIG. 9, the size of the object OJ is enlarged, the changer 253 also increases a value for the information (in one example, a display magnification) about the object stored in the storage 240. As a result, the generator 251 synthesizes the size of the object in an enlarged manner in the live video as well. That is, as illustrated in FIG. 10, the generator 251 generates a viewer video in which the object OJ having an enlarged size is synthesized in the live video LV. Moreover, after the streamer removes the fingers, the generator 251 generates, in accordance with the updated information about the object and the like, a streamer video in which the object OJ is synthesized in the mirror image video MV and, as a result, the enlarged object OJ is maintained in the streamer video as well.

Note that changing the display mode of the object in accordance with the operation from the streamer is not limited to changing the size of the object. A configuration is possible in which the changer 253 changes one of a shape, a color, a pattern, a brightness, and a luminance of the object in accordance with the operation from the streamer. Thus, the streamer can directly operate, during streaming, the object in the mirror image video displayed on the display 260, and change that object to an intended display mode.

Figure 11:
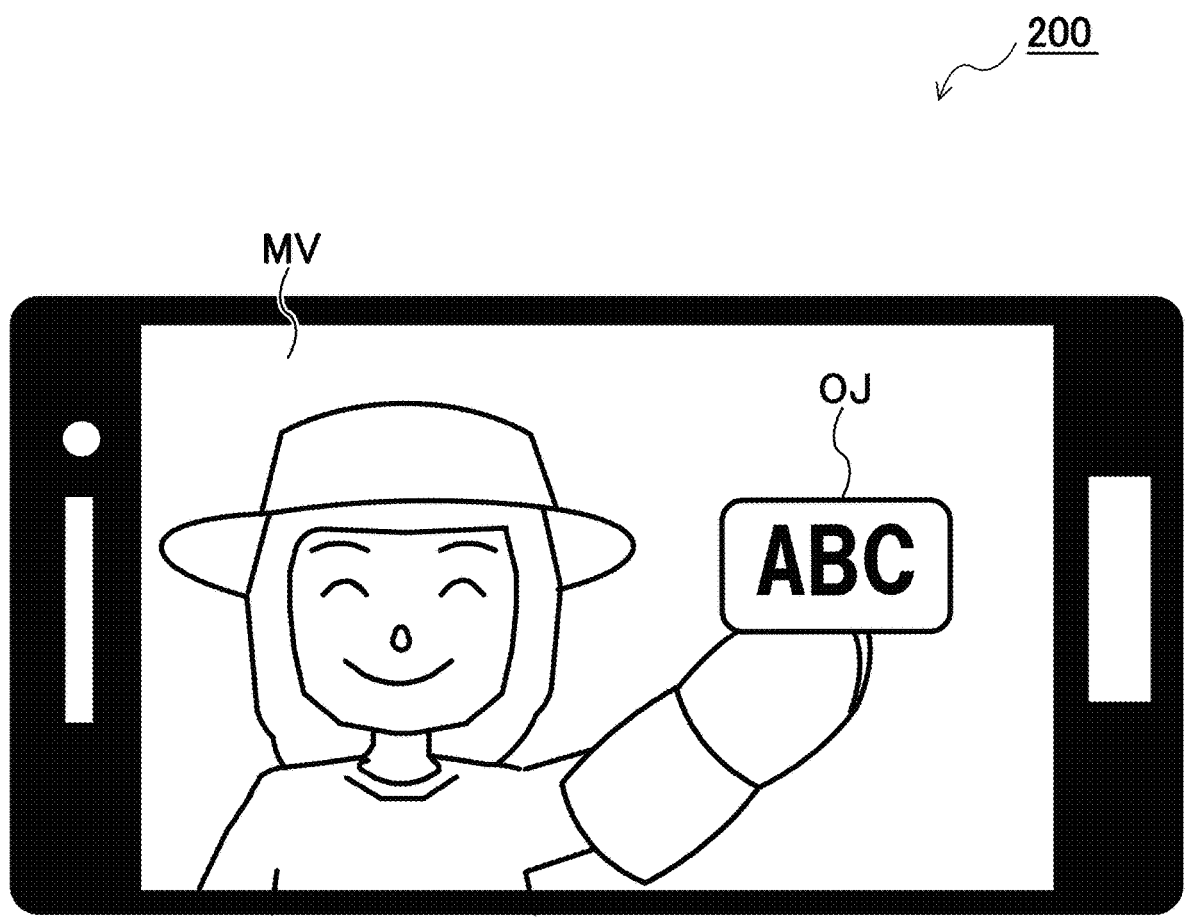
FIG. 11 is a schematic view illustrating a case in which the object in the streamer video is drag-operated by the streamer.
Figure 12:
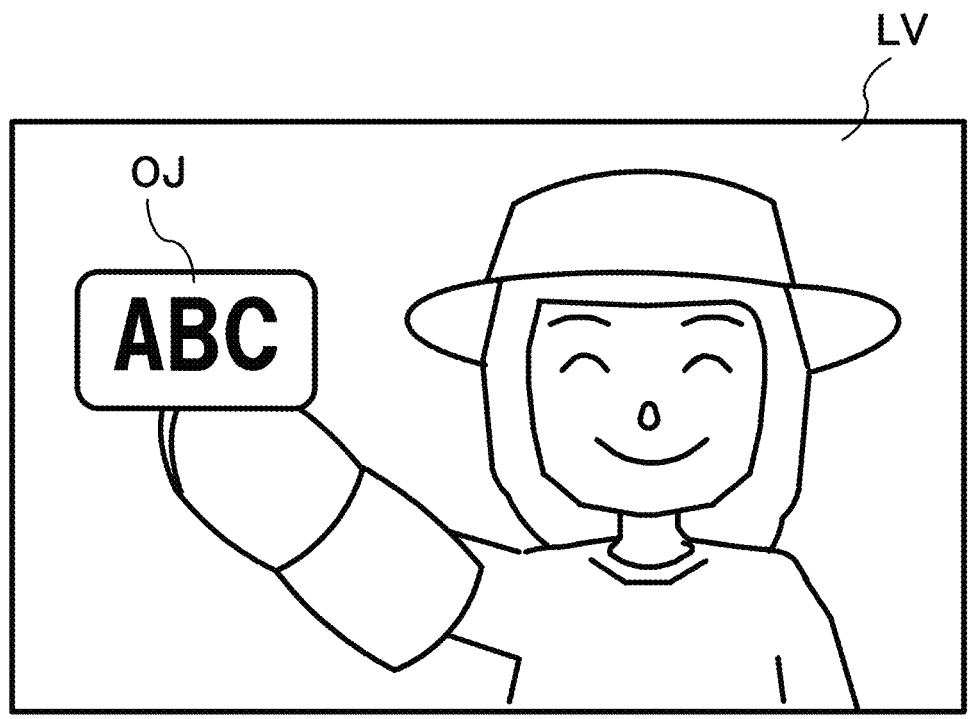
FIG. 12 is a schematic view illustrating a situation in which a position of the object synthesized in the viewer video is changed in accordance with the drag-operation of the streamer.

When the object in the streamer video is moved to a new position due to an operation from the streamer, the changer 253 changes the object synthesized in the live video to a normal image position relative to that new position. For example, when the operation receiver 230 receives a drag-operation (an operation of pressing the object OJ with a finger and, then, while pressing, moving that finger) performed on the object OJ, the changer 253 moves the object OJ to the new position corresponding to the drag-operation, as illustrated in FIG. 11. Note that, when the changer 253 moves the object OJ in the streamer video, the changer 253 also updates the synthesis position of the object stored in the storage 240. Specifically, the changer 253 changes the synthesis position to a normal image position relative to the new position of the object OJ that is moved in the streamer video. As a result, as illustrated in FIG. 12, the generator 251 generates a viewer video in which the object OJ is appropriately moved and synthesized in the live video LV as well. Moreover, after the streamer removes the finger, the generator 251 generates a streamer video in which the object OJ is synthesized at the mirror image position in the mirror image video MV relative to the updated synthesis position and, as a result, the position of the moved object OJ is maintained in the streamer video as well. Thus, the streamer can directly operate, during streaming, the object in the mirror image video displayed on the display 260, and freely move that object.

Note that the CPU 401 described above or the like can function as the controller 250 having such a configuration.

Returning to FIG. 4, the display 260 displays the streamer video generated by the generator 251 and the like. That is, the display 260 displays the streamer video such as illustrated in FIGS. 8, 9, and 11.

Operations of Streamer Terminal 200

Figure 13:
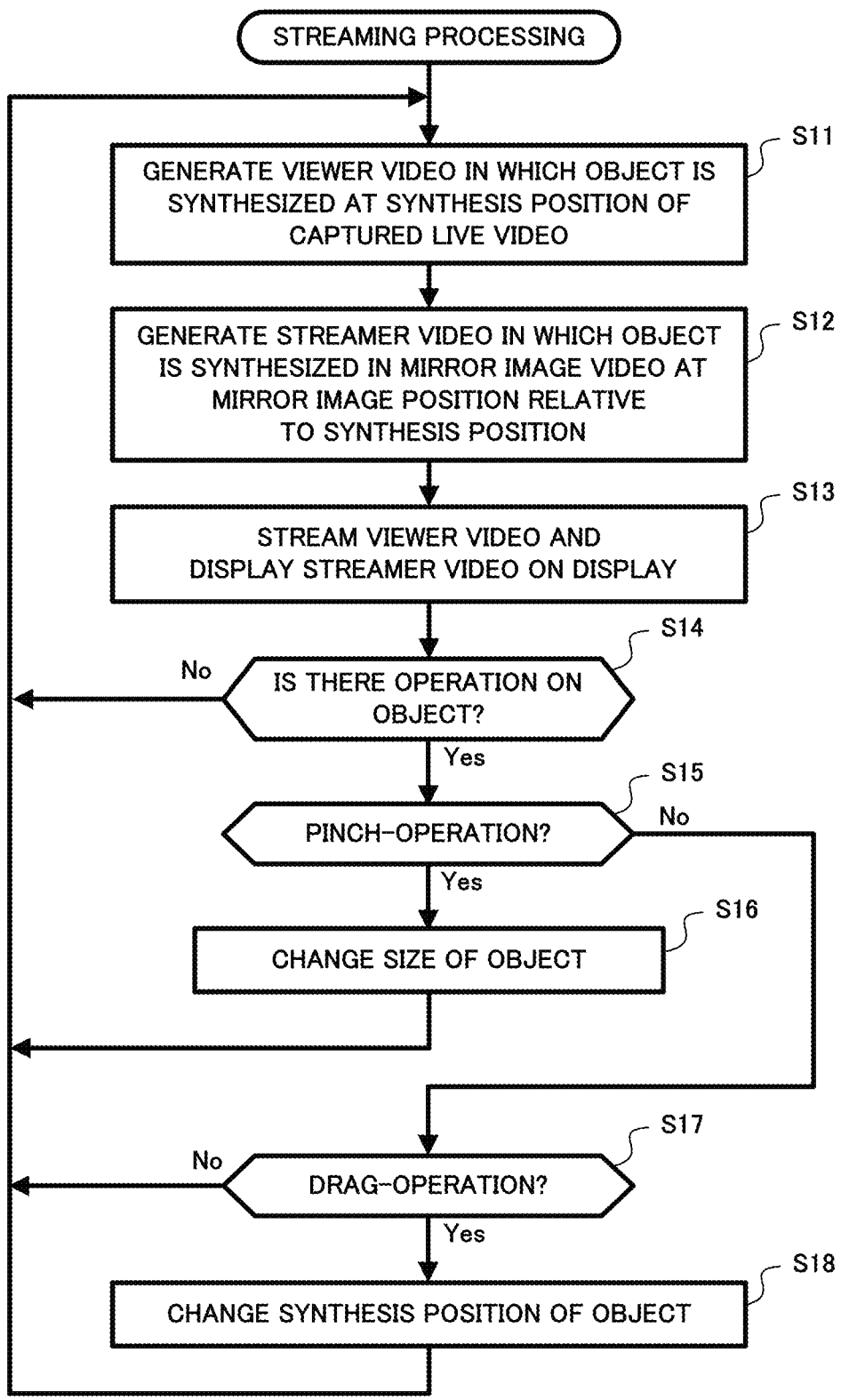
FIG. 13 is a flowchart for explaining streaming processing according to Embodiment 1.

Next, the operations of the streamer terminal 200 are described while referencing FIG. 13. FIG. 13 is a flowchart for explaining streaming processing according to Embodiment 1. This streaming processing starts when live streaming by the streamer starts, and ends when the live streaming ends. That is, the streaming processing is executed by the streamer terminal 200 throughout the period during which the live streaming is being performed.

Firstly, the streamer terminal 200 generates a viewer video in which the object is synthesized at the synthesis position of the captured live video (step S11). Specifically, in accordance with the information and the synthesis position of the object stored in the storage 240, the controller 250 (the generator 251) generates a viewer video in which the object OJ is synthesized in the live video LV, as illustrated in FIG. 7.

The streamer terminal 200 generates a streamer video in which the object is synthesized in the mirror image video, at the mirror image position relative to the synthesis position (step S12). Specifically, in accordance with the mirror image position relative to the synthesis position and the information of the object stored in the storage 240, the controller 250 (the generator 251) generates a streamer video in which the object OJ is synthesized in the mirror image video MV, as illustrated in FIG. 8.

The streamer terminal 200 streams the viewer video, and displays the streamer video on the display 260 (step S13). Specifically, the controller 250 (the streaming unit 252) sends the viewer video generated in step S11 to the streaming server 100 for streaming to the viewer terminal 300. That is, the controller 250 controls the sender/receiver 220 to send the viewer video such as illustrated in FIG. 7 to the streaming server 100, and stream the viewer video to the viewer terminal 300 via the streaming server 100. Additionally, the display 260 displays the streamer video generated in step S12. That is, the display 260 displays the streamer video such as illustrated in FIG. 8. As a result, the streamer DI can normally read the character information of the object OJ synthesized in the mirror image video MV or normally point to the object OJ. Therefore, the object OJ is correctly pointed to, even in the viewer video of FIG. 7. As a result, the streamer that is performing the live streaming can be appropriately supported.

The streamer terminal 200 determines whether there is an operation performed on the object (step S14). Specifically, the controller 250 determines whether the operation receiver 230 receives an operation directed at the object in the streamer video displayed on the display 260.

When the streamer terminal 200 determines that there is no operation performed on the object (step S14; No), the processing of step S11 is executed.

Meanwhile, when it is determined that there is an operation performed on the object (step S14; Yes), the streamer terminal 200 determines whether that operation is a pinch-operation (step S15).

When the streamer terminal 200 determines that the operation is a pinch-operation (step S15; Yes), the streamer terminal 200 changes the size of the object (step S16). That is, the controller 250 (the changer 253) changes the size of the object in accordance with the pinch-operation performed on the object in the streamer video. Specifically, when the operation is a pinch-out of the object, the controller 250 enlarges the size of the object OJ, as illustrated in FIG. 9. Conversely, when the operation is a pinch-in of the object, the controller 250 reduces the size of the object. Note that, when the controller 250 changes the size of the object in the streamer video, the controller also updates the information about the object stored in the storage 240. For example, when, as in FIG. 9, the size of the object OJ is enlarged, the controller 250 also increases the value for the information about the object stored in the storage 240. As a result, the controller 250 synthesizes the size of the object in an enlarged manner in the live video as well. That is, as illustrated in FIG. 10, the controller 250 generates a viewer video in which the object OJ is synthesized having an enlarged size in the live video LV. Moreover, after the streamer removes the fingers, the controller 250 generates, in accordance with the updated information about the object and the like, a streamer video in which the object is synthesized in the mirror image video and, as a result, the enlarged object is maintained in the streamer video as well.

When the size of the object is changed in this manner, the streamer terminal 200 returns to the processing of step S11.

Meanwhile, when a determination is made that the operation is not a pinch-operation (step S15; No), the streamer terminal 200 determines whether that operation is a drag-operation (step S17).

When the streamer terminal 200 determines that the operation is not a drag-operation (step S17; No), the streamer terminal 200 returns to the processing of step S11.

Meanwhile, in a case in which the streamer determines that the operation is a drag-operation (step S17; Yes), the streamer terminal 200 changes the synthesis position of the object (step S18). That is, as illustrated in FIG. 11, the controller 250 (the changer 253) moves the object OJ in the streamer video to a new position corresponding to the drag-operation. Note that, when the controller 250 moves the object OJ in the streamer video, the controller 250 also updates the synthesis position of the object stored in the storage 240. Specifically, the controller 250 changes the synthesis position to a normal image position relative to the new position of the object OJ moved in the streamer video. As a result, as illustrated in FIG. 12, the controller 250 (the generator 251) generates a viewer video in which the object OJ is appropriately moved and synthesized in the live video LV as well. Moreover, after the streamer removes the finger, the controller 250 generates a streamer video in which the object is synthesized at the mirror image position in the mirror image video relative to the updated synthesis position and, as a result, the position of the moved object is maintained in the streamer video as well.

When the synthesis position of the object is changed in this manner, the streamer terminal 200 returns to the processing of step S11.

Note that, in the streaming processing illustrated in FIG. 13, a case is described in which the size of the object is changed in accordance with a pinch-operation from the streamer, but a configuration is possible in which, other than the size of the object, any of the shape, the color, the pattern, the brightness, and the luminance of the object is changed.

Due to the streaming processing described above, as illustrated in FIG. 8, the object OJ is synthesized at an appropriate position in the mirror image video MV and, as such, the streamer can normally read the character information of the object OJ or normally point to the object OJ. Therefore, the object OJ is correctly pointed to, even in the viewer video of FIG. 7. As a result, the streamer that is performing the live streaming can be appropriately supported.

Additionally, due to the streaming processing, the streamer can directly operate, during streaming, the object in the mirror image video displayed on the display 260, and change that object to an intended display mode.

Moreover, due to the streaming processing, the streamer can directly operate, during streaming, the object in the mirror image video displayed on the display 260, and freely move that object.

Embodiment 2

In Embodiment 1, a simple live streaming system 1 is described, but a live streaming system that is compatible with live streaming commerce is possible. In the following, a live streaming system that is compatible with live streaming commerce is described.

Figure 14:
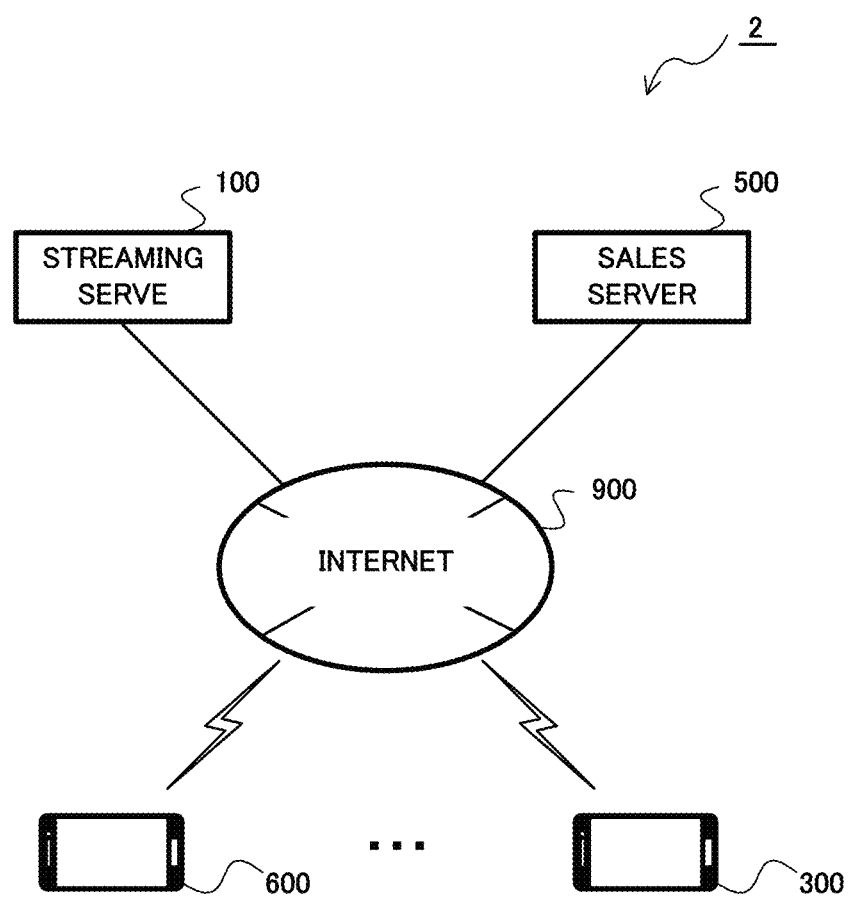
FIG. 14 is a schematic view illustrating an example of the entire configuration of a live streaming system according to Embodiment 2 of the present disclosure.

FIG. 14 is a schematic view illustrating an example of the entire configuration of a live streaming system 2 according to Embodiment 2 of the present disclosure. In one example, the live streaming system 2 is a system that is compatible with live streaming commerce, and is communicably connected, via an internet 900, to a streaming server 100 for managing streaming, a sales server 500 for managing sales, a streamer terminal 600 used by a streamer, and a viewer terminal 300 used by a viewer. Note that the configurations of the streaming server 100 and the viewer terminal 300 are the same as those of the streaming server 100 and the viewer terminal 300 of the live streaming system 1 of FIG. 1 described above. Additionally, it is assumed that multiple viewer terminals 300 exist, the number thereof corresponding to the number of viewers using the system.

In one example, the sales server 500 is a server computer or the like, and sells a product introduced by the streamer during streaming from the streamer terminal 600. More specifically, the sales server 500 sells a product to a viewer terminal 300 (a viewer) that transitions in accordance with transition information for transitioning to the sales server 500 (more specifically, a sales page of the product).

In one example, the streamer terminal 600 is a terminal such as a smartphone, a tablet, a PC or the like, and is used by the streamer that performs streaming of live video. The streamer terminal 600 streams, to the viewer terminal 300, a viewer video in which an object (purchase button described later) or the like to which the transition information is appended is synthesized in a live video. Here, the object is for purchasing the product being introduced in the streaming.

Next, functions and the like of sales server 500 and the streamer terminal 600 realized in the information processing device 400 of FIG. 2 described above are described while referencing FIGS. 15 to 19. When the power of the information processing device 400 is turned ON, a program causing the information processing device 400 to function as the sales server 500 and the streamer terminal 600 according to Embodiment 2 is executed, and the sales server 500 and the streamer terminal 600 according to Embodiment 2 are realized.

Functional Configuration of Sales Server 500

Figure 15:
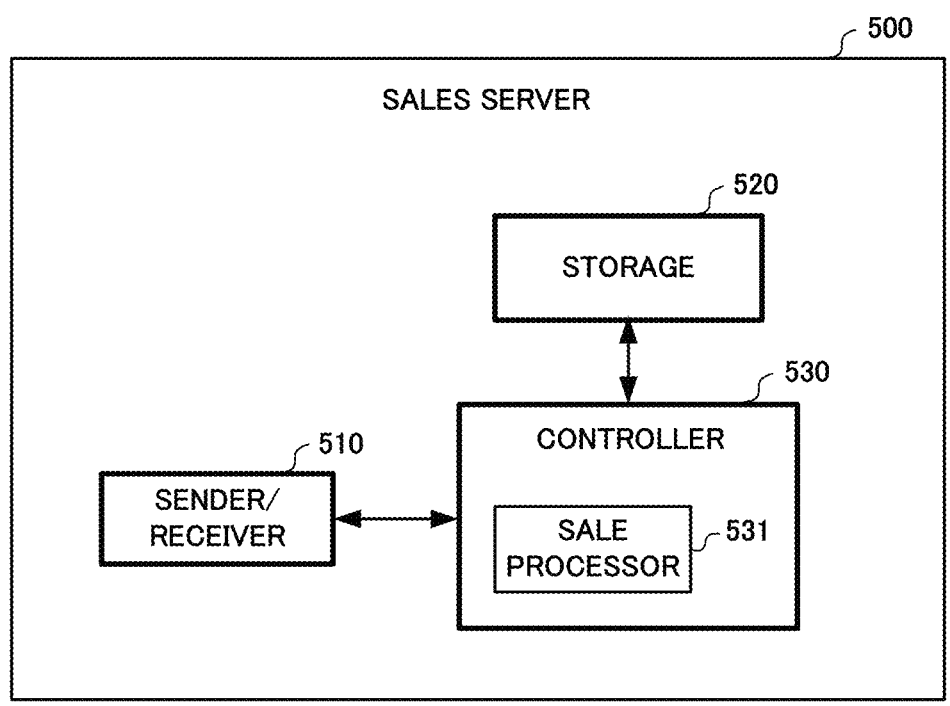
FIG. 15 is a block diagram illustrating an example of the functional configuration of a sales server.

FIG. 15 is a block diagram illustrating an example of the functional configuration of the sales server 500. As illustrated in FIG. 15, the sales server 500 includes a sender/receiver 510, a storage 520, and a controller 530.

The sender/receiver 510 exchanges a variety of information with the viewer terminal 300 via the internet 900. For example, the sender/receiver 510 sends the sales page of the product to the viewer terminal 300 in response to an access from the viewer terminal 300 in accordance with the transition information. Note that the NIC 404 described above can function as this sender/receiver 510.

The storage 520 stores a variety of information needed for the processing carried out in the sales server 500. For example, the storage 520 stores detail information, price information, and inventory information about the product to be sold. Additionally, the storage 520 stores personal information (ID, name, address, credit card number, and the like) of the viewer using the viewer terminal 300. Note that the auxiliary storage 407 described above or the like can function as this storage 520.

The controller 530 controls the entire sales server 500. In one example, the controller 530 includes a sale processor 531.

The sale processor 531 confirms the sale of the product in accordance with an operation from the viewer terminal 300 (the viewer) that views the sales page of the product.

The CPU 401 described above or the like can function as the controller 530 having such a configuration.

Functional Configuration of Streamer Terminal 600

Figure 16:
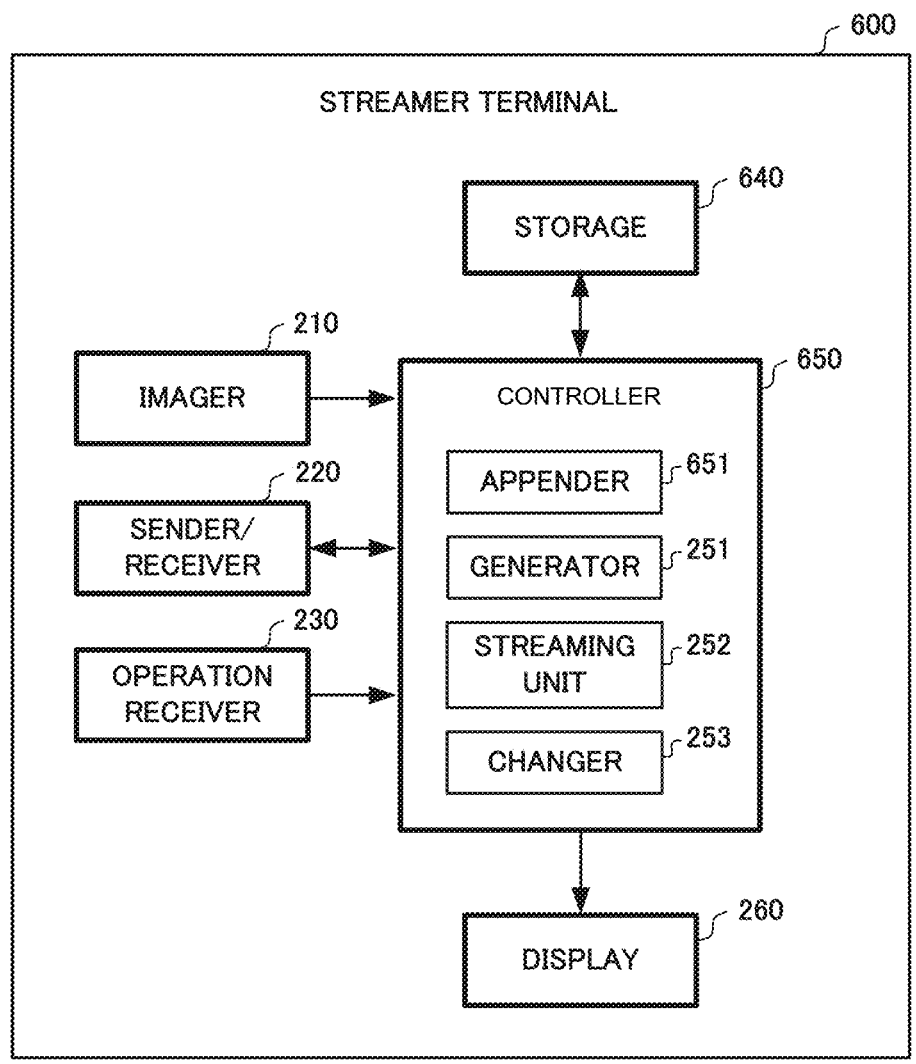
FIG. 16 is a block diagram illustrating an example of the functional configuration of a streamer terminal according to Embodiment 2.
Figure 17:
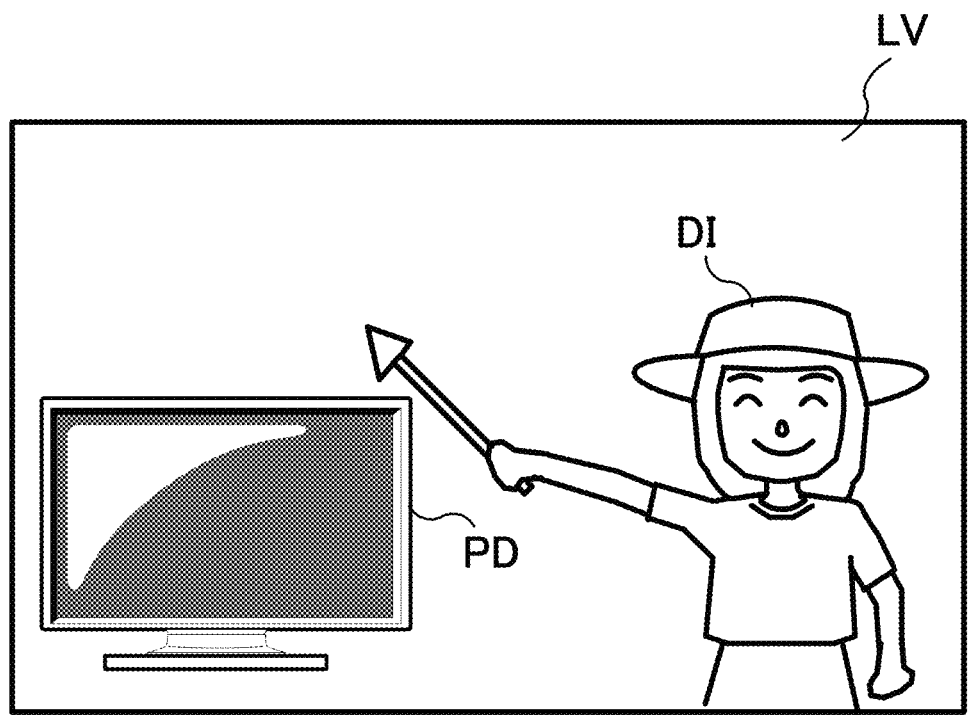
FIG. 17 is a schematic drawing illustrating an example of a live video being captured for live streaming commerce.

FIG. 16 is a block diagram illustrating an example of the functional configuration of the streamer terminal 600 according to Embodiment 2. As illustrated in FIG. 16, the streamer terminal 600 includes an imager 210, a sender/receiver 220, an operation receiver 230, a storage 640, a controller 650, and a display 260. Note that the configurations of the imager 210, the sender/receiver 220, the operation receiver 230, and the display 260 are the same as those of the imager 210, the sender/receiver 220, the operation receiver 230, and the display 260 of the streamer terminal 200 of FIG. 4 described above. Additionally, note that the imager 210 outputs a live video LV including a product PD to be introduced and the streamer DI, such as illustrated in FIG. 17.

Returning to FIG. 16, the storage 640 stores a variety of information needed for the processing carried out in the streamer terminal 600. For example, the storage 640 stores information about an object to be synthesized in the live video or the like, a synthesis position of the object, and the like and, also, stores the transition information for purchasing the product introduced during the streaming. In one example, the transition information is link information to the sales page of the corresponding product in the sales server 500. Note that the auxiliary storage 407 described above or the like can function as this storage 640.

The controller 650 controls the entire streamer terminal 600. In one example, the controller 650 includes an appender 651, a generator 251, a streaming unit 252, and a changer 253. Note that the configurations of the generator 251, the streaming unit 252 and the changer 253 are the same as those of the generator 251, the streaming unit 252, and the changer 253 of the streamer terminal 200 (the controller 250) of FIG. 4 described above.

The appender 651 appends the transition information of the product being introduced during the streaming to a specific object (in one example, the purchase button) stored in the storage 640. Note that, when the transition information of a product for which the introduction has already ended is appended to the object, the appender 651 appends the transition information of the product currently being introduced to the object by overwriting. When such an object to which the transition information is appended is tap-operated on the viewer terminal 300, it is possible to transition to the sales page of the corresponding product in the sales server 500.

Figure 18:
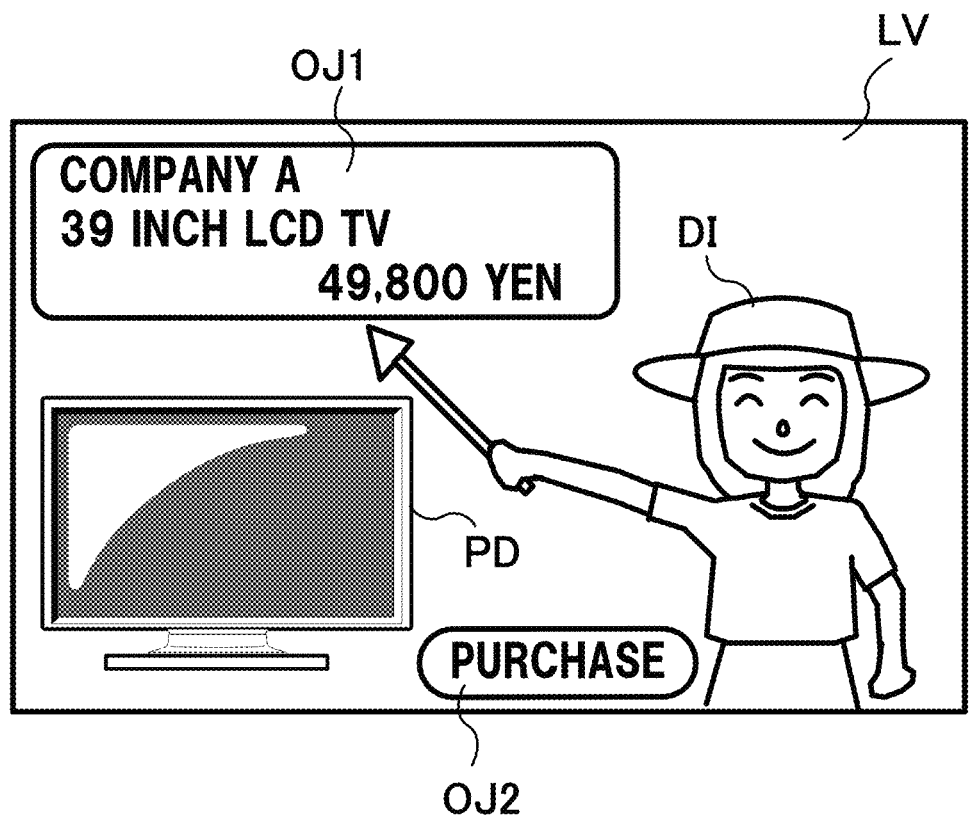
FIG. 18 is a schematic view illustrating an example of a viewer video in which a plurality of objects is synthesized in the live video.

Moreover, the generator 251 generates a viewer video in which the necessary objects are synthesized at the predetermined synthesis positions in the live video captured by the imager 210. For example, in accordance with the information and the synthesis positions of the objects stored in the storage 640, the generator 251 generates a viewer video in which objects OJ1, OJ2 are synthesized in the live video LV, as illustrated in FIG. 18. Note that the object OJ1 is a subtitle (banner) for explaining the product PD, and includes character information such as a product name, a price, and the like. The object OJ2 is a purchase button, and includes the character information of "purchase" and the transition information appended by the appender 651.

Figure 19:
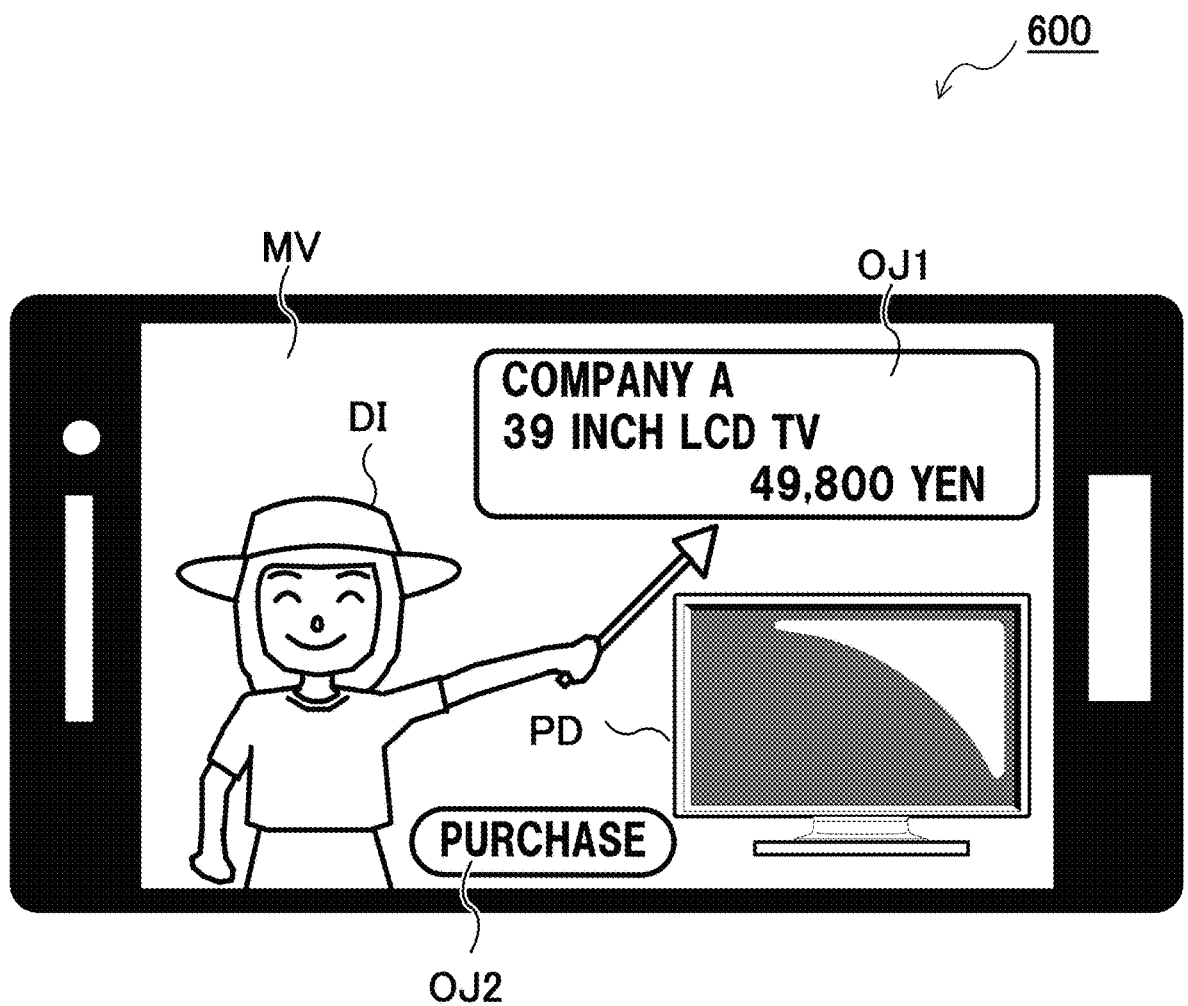
FIG. 19 is a schematic view illustrating an example of a case in which a streamer video, obtained by synthesizing the plurality of objects in a mirror image video, is displayed on the streamer terminal.

At the same time, the generator 251 generates a streamer video obtained by synthesizing the objects in a mirror image video in which the live video is inverted. For example, in accordance with the mirror image position relative to the synthesis position and the information of the object stored in the storage 640, the generator 251 generates a streamer video in which the objects OJ1, OJ2 are synthesized in a mirror image video MV, as illustrated in FIG. 19. Note that FIG. 19 illustrates a situation in which the streamer video is being displayed on the display 260. As a result, the streamer DI can normally read the character information of the objects OJ1, OJ2 synthesized in the mirror image video MV displayed on the display 260, and can normally point to the objects OJ1, OJ2. Therefore, the objects OJ1, OJ2 are correctly pointed to, even in the viewer video of FIG. 18 described above. As a result, the streamer that is performing the live streaming can be appropriately supported.

Note that, as in Embodiment 1, the changer 253 changes, in accordance with an operation from the streamer with respect to the object in the streamer video, a display mode of the object synthesized in the live video and the mirror image video. Additionally, as in Embodiment 1, when the object in the streamer video is moved to a new position due to an operation by the streamer, the changer 253 changes the object synthesized in the live video to a normal image position relative to that new position.

Note that the CPU 401 described above or the like can function as the controller 650 having such a configuration.
Operations of Viewer Terminal 300

Figure 20:
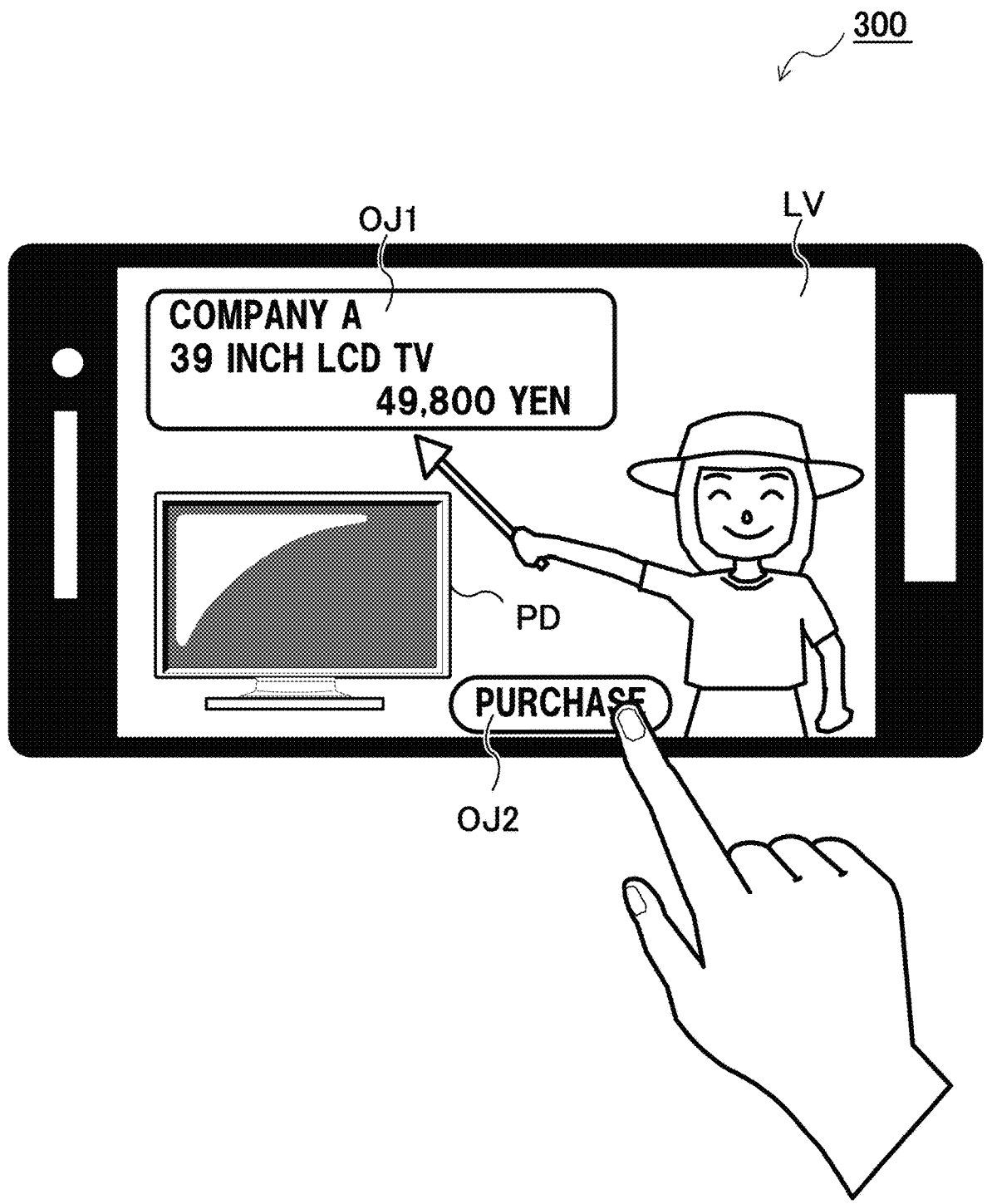
FIG. 20 is a schematic view illustrating an example of a viewer video displayed on a viewer terminal.
Figure 21:
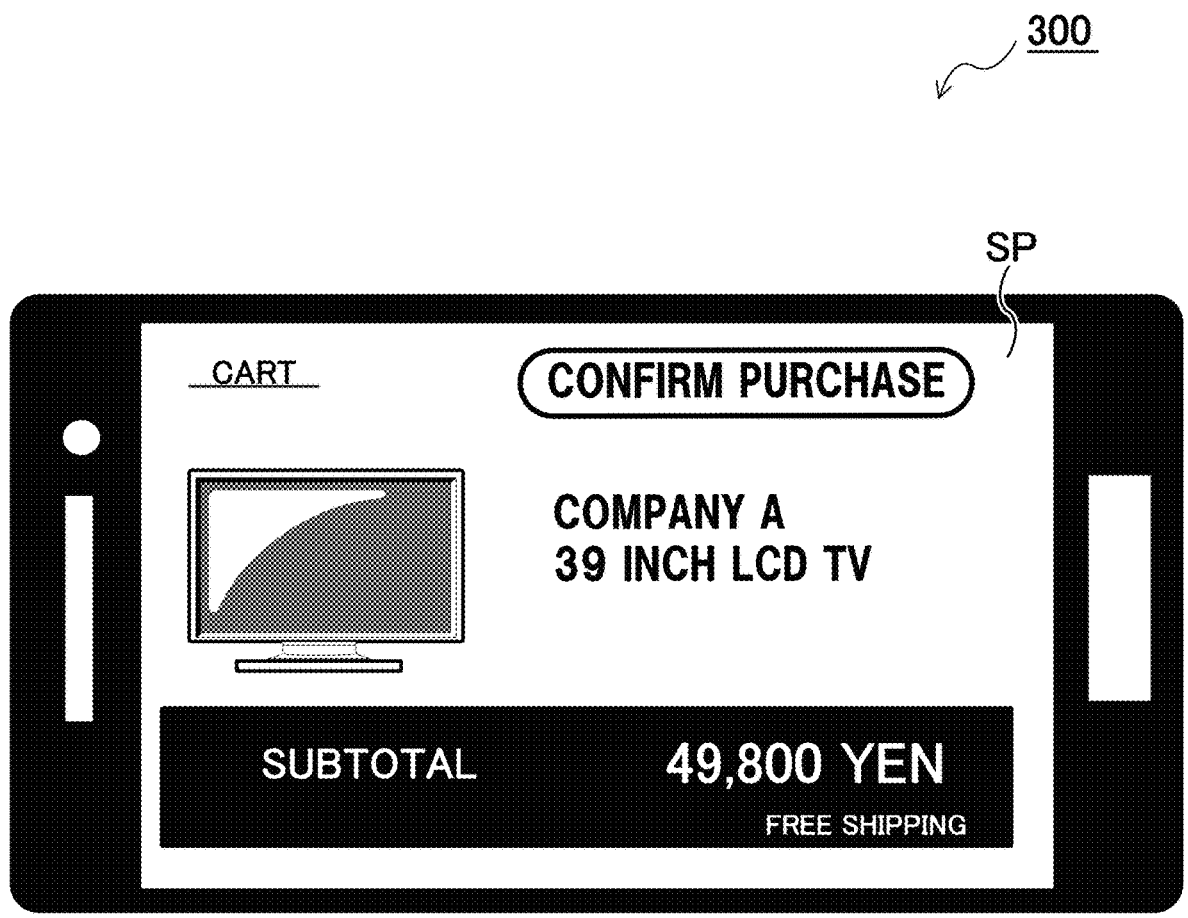
FIG. 21 is a schematic drawing illustrating an example of a sales page displayed on the viewer terminal.

Next, the operations of the viewer terminal 300 are described while referencing FIGS. 20 and 21.

When the viewer video is streamed from the streamer terminal 600, the viewer terminal 300 displays the viewer video such as illustrated in FIG. 20, for example, on the display. Moreover, when the viewer desires to purchase the product PD introduced during the streaming, the viewer tap-operates the object OJ2.

When the viewer tap-operates the object OJ2, the viewer terminal 300 accesses the sales server 500 in accordance with the transition information appended to the object OJ2 and displays, on the display, a sales page SP such as illustrated in FIG. 21. Note that a configuration is possible in which, prior to displaying the sales page, the viewer terminal 300 displays an authentication screen for logging in to the sales server 500. Then, when the purchase is confirmed on the sales page SP, the sale is completed.

Thus, even with the live streaming system 2 that is compatible with live streaming commerce, the streamer can normally read the character information of the objects OJ1, OJ2 synthesized in the mirror image video MV such as illustrated in FIG. 19 displayed on the display 260, and can normally point to the objects OJ1, OJ2. Therefore, the objects OJ1, OJ2 are correctly pointed to, even in the viewer video FIG. 18. As a result, the streamer that is performing the live streaming can be appropriately supported.

OTHER EMBODIMENTS

In Embodiments 1 and 2, a case is described in which the generator 251 and the like is included in the controller 250, 650 of the streamer terminal 200, 600, and the streamer terminal 200, 600 synthesizes the object in the live video and the mirror image video. However, a configuration is possible in which a configuration that is the same as the generator 251 is added to the controller 140 of the streaming server 100. In such a case, on the streaming server 100 side, the objects are synthesized in the live video and the mirror image video, and the streamer terminal 200, 600 displays, on the display 260, a streamer video returned from the streaming server 100. In this case as well, the streamer can normally read the character information of the objects synthesized in the mirror image video displayed on the display 260, and can normally point to the objects. Therefore, the objects are correctly pointed to, even in the viewer video. As a result, the streamer that is performing the live streaming can be appropriately supported.

In Embodiments 1 and 2, a case is described in which an object including character information is synthesized in the live video and the mirror image video. However, the present disclosure can, for example, also be appropriately applied to a case in which an object including a plurality of images is synthesized in the live video and the mirror image video. Specifically, when synthesizing an object including images of two bottles in the live video and the mirror image video, the streamer can confirm the images of the object, and give a correct explanation such as "the bottle on the right is salt, and the bottle on the left is pepper" without modifying the order.

In Embodiments 1 and 2, a configuration is possible in which the program to be executed by the streamer terminal 200, 600 and the like is stored and distributed on a non-transitory computer-readable medium such as a compact disc read-only memory (CD-ROM), a digital versatile disc (DVD), a magneto-optical disc (MO), a USB memory, a memory card, or the like. Moreover, by installing that program on a specific or general-use computer, that computer can be made to function as the streamer terminal 200, 600 of Embodiments 1 and 2.

A configuration is possible in which the program is stored on a disc device of a server device installed on communication network such as the internet, and downloaded to the computer by being superimposed on a carrier wave, for example. The processing described above can also be achieved by starting up and executing the program while transferring the program via the communication network. Furthermore, the processing described above can also be achieved by causing a portion or the entirety of the program to be executed on the server device, and executing the program while the computer sends and receives information related to the processing of the program via the communication network.

Note that, in cases in which the functions described above are realized in part by an operating system (OS), or the functions are realized by cooperation between an OS and an application, it is possible to store and distribute only the portion other than the OS on the non-transitory computer readable medium, or download the portion other than the OS to the computer.

[1] A streamer terminal, including:
a processor configured to execute
sending of a viewer video that is a video in which an object is synthesized at a predetermined synthesis position in a live video captured by an imager, and that is for streaming to a viewer terminal, and
displaying of a streamer video that is a video obtained by synthesizing the object in a mirror image video in which the live video is inverted, and in which the object is synthesized at a mirror image position relative to the synthesis position.

[2] The streamer terminal according to [1], wherein
the processor is further configured to execute
changing, in accordance with an operation from a streamer with respect to the object in the streamer video, a display mode for the object synthesized in the live video and the mirror image video.

[3] The streamer terminal according to [2], wherein the changing of the display mode includes at least one of a change of a size, a shape, a color, a pattern, a brightness, and a luminance of the object.

[4] The streamer terminal according to any one of [1] to [3], wherein
the processor is further configured to,
when the object in the streamer video is moved to a new position due to an operation by the streamer, execute changing of a position of a normal image relative to the new position for the object synthesized in the live video.

[5] The streamer terminal according to any one of [1] to [4], wherein transition information for transitioning to a sales server for selling a product is appended to the object.

[6] The streamer terminal according to any one of [1] to [5], wherein the object includes character information.

[7] A display method, comprising:
executing, by a computer,
sending of a viewer video that is a video in which an object is synthesized at a predetermined synthesis position in a live video captured by an imager, and that is for streaming to a viewer terminal, and
displaying of a streamer video that is a video obtained by synthesizing the object in a mirror image video in which the live video is inverted, and in which the object is synthesized at a mirror image position relative to the synthesis position.

[8] A non-transitory computer readable medium storing a program for causing a computer to execute:
sending of a viewer video that is a video in which an object is synthesized at a predetermined synthesis position in a live video captured by an imager, and that is for streaming to a viewer terminal, and
displaying of a streamer video that is a video obtained by synthesizing the object in a mirror image video in which the live video is inverted, and in which the object is synthesized at a mirror image position relative to the synthesis position.

INDUSTRIAL APPLICABILITY

The present disclosure can be suitably adopted for a streamer terminal, a display method, and a non-transitory computer readable medium capable of appropriately supporting the streamer.

REFERENCE SIGNS LIST 1, 2 Live streaming system
100 Streaming server
110 Receiver
120 Sender
130 Storage
140 Controller
141 Manager
142 Streaming controller
200, 600 Streamer terminal
210 Imager
220 Sender/receiver
230 Operation receiver
240, 640 Storage
250, 650 Controller
251 Generator
252 Streaming unit
253 Changer
651 Appender
260 Display
300 Viewer terminal
400 Information processing device
401 CPU
402 ROM
403 RAM
404 NIC
405 Image Processor
406 Audio processor
407 Auxiliary storage
408 Interface 409 Imaging unit
410 Operation unit
411 Display unit
500 Sales server
510 Sender/receiver
520 Storage
530 Controller
531 Sale processor
900 Internet

The invention claimed is:

1. A streaming terminal, comprising:
a processor configured to execute:
sending a viewer video that is a video in which an object is synthesized at a predetermined synthesis position in a live video captured by an imager, and streaming the video to a viewer terminal,
displaying a streamer video that is a video obtained by synthesizing the object in a mirror image video in which the live video is inverted, and in which the object is synthesized at a mirror image position relative to the synthesis position, and
when the object in the streamer video is moved to a new position due to a drag operation by a streamer, executing changing of a position of a normal image relative to the new position for the object synthesized in the live video.

2. The streaming terminal according to claim 1, wherein the processor is further configured to execute
changing, in accordance with an operation from the streamer with respect to the object in the streamer video, a display mode for the object synthesized in the live video and the mirror image video.

3. The streaming terminal according to claim 2, wherein the changing of the display mode includes at least one of a change of a size, a shape, a color, a pattern, a brightness, and a luminance of the object.

4. The streaming terminal according to claim 1, wherein transition information for transitioning to a sales server for selling a product is appended to the object.

5. The streaming terminal according to claim 1, wherein the object includes character information.

6. A display method, comprising:
executing, by a computer:
sending a viewer video that is a video in which an object is synthesized at a predetermined synthesis position in a live video captured by an imager, and streaming the video to a viewer terminal,
displaying a streamer video that is a video obtained by synthesizing the object in a mirror image video in which the live video is inverted, and in which the object is synthesized at a mirror image position relative to the synthesis position, and
when the object in the streamer video is moved to a new position due to a drag operation by the streamer, executing changing of a position of a normal image relative to the new position for the object synthesized in the live video.

7. A non-transitory computer readable medium storing a program for causing a computer to execute:
sending a viewer video that is a video in which an object is synthesized at a predetermined synthesis position in a live video captured by an imager, and streaming the video to a viewer terminal,
displaying a streamer video that is a video obtained by synthesizing the object in a mirror image video in which the live video is inverted, and in which the object is synthesized at a mirror image position relative to the synthesis position, and
when the object in the streamer video is moved to a new position due to a drag operation by the streamer, executing changing of a position of a normal image relative to the new position for the object synthesized in the live video.

\* \* \* \* \*